(12) United States Patent
Suzuki et al.

(10) Patent No.: US 6,856,065 B2
(45) Date of Patent: *Feb. 15, 2005

(54) ELECTRIC ROTARY MACHINE HAVING POSITIONING RING FOR SECURING SALIENT POLES IN PLACE

(75) Inventors: Yuzuru Suzuki, Shizuoka-ken (JP); Seiichi Matsuura, Shizuoka-ken (JP); Sakae Fujitani, Shizuoka-ken (JP); Kazuo Muramatsu, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/370,971

(22) Filed: Feb. 20, 2003

(65) Prior Publication Data

US 2003/0160533 A1 Aug. 28, 2003

(30) Foreign Application Priority Data

Feb. 27, 2002 (JP) .................................. 2002-051005

(51) Int. Cl.$^7$ .............................. H02K 1/12; H02K 15/02
(52) U.S. Cl. ...................................... 310/218; 310/216
(58) Field of Search ........................... 310/216, 217, 310/218, 254, 259, 42

(56) References Cited

U.S. PATENT DOCUMENTS

| | | | | |
|---|---|---|---|---|
| 3,914,859 A | * | 10/1975 | Pierson | 29/596 |
| 4,466,182 A | * | 8/1984 | Lamatsch et al. | 29/596 |
| 6,081,059 A | * | 6/2000 | Hsu | 310/179 |
| 6,304,018 B1 | * | 10/2001 | Ham et al. | 310/216 |
| 6,356,005 B1 | * | 3/2002 | Hsu | 310/254 |
| 6,404,095 B1 | * | 6/2002 | Hsu | 310/254 |
| 6,411,006 B2 | * | 6/2002 | Suzuki et al. | 310/254 |
| 6,445,095 B1 | * | 9/2002 | Liang et al. | 310/64 |
| 6,448,685 B1 | * | 9/2002 | Mayer et al. | 310/254 |
| 6,472,792 B1 | * | 10/2002 | Jack et al. | 310/254 |
| 6,583,530 B2 | * | 6/2003 | Hsu | 310/254 |

FOREIGN PATENT DOCUMENTS

| | | |
|---|---|---|
| EP | 1 128 524 | 8/2001 |
| JP | 2001-238377 | 8/2001 |

* cited by examiner

*Primary Examiner*—Tran Nguyen
(74) *Attorney, Agent, or Firm*—Fay, Sharpe, Fagan, Minnich & McKee, LLP

(57) ABSTRACT

An electric rotary machine includes a stator comprising: a stator ring; a plurality of discrete salient poles each comprising a bobbin with guide grooves and a pole tooth with a groove, disposed inside the stator ring, and fixed by a molding resin injected inside the stator ring; and a positioning ring having protrusions at its outer circumference and engaging with the discrete salient poles such that the protrusions are each fitted into the groove of the pole tooth.

4 Claims, 6 Drawing Sheets

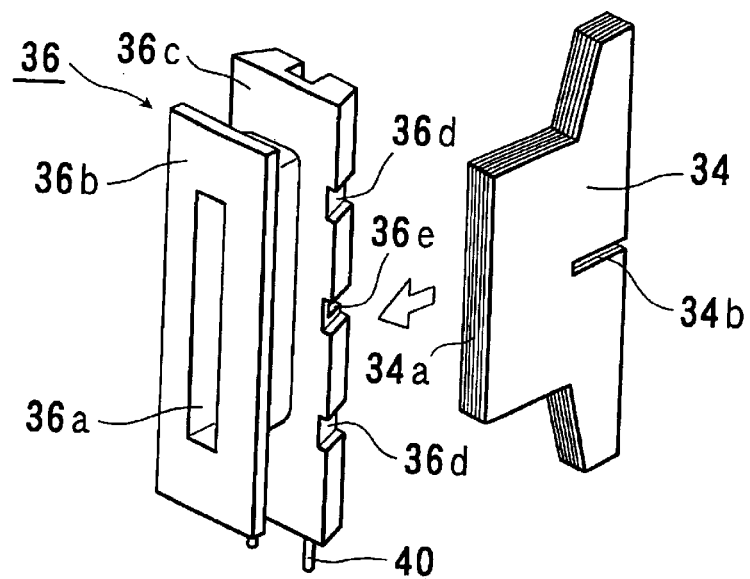
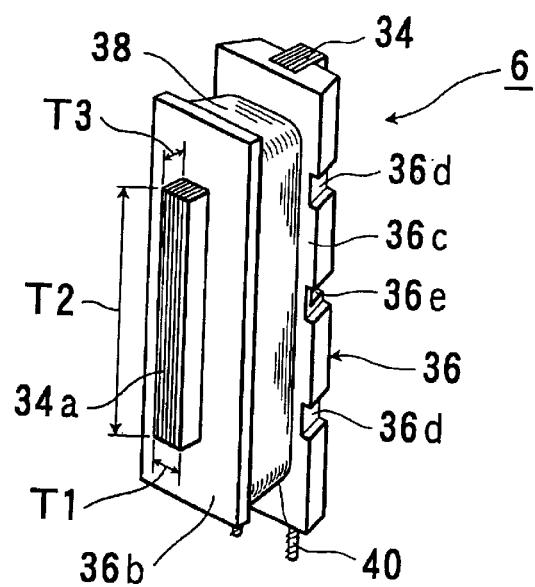

ELECTRIC ROTARY MACHINE HAVING POSITIONING RING FOR SECURING SALIENT POLES IN PLACE

BACKGROUND OF THE INVENTION

1. Field of the Invention

The present invention relates to an electric rotary machine (hereinafter referred to as "rotary machine," or occasionally "motor" as appropriate), and more particularly to a radial gap type rotary machine comprising an armature with discrete salient poles.

2. Description of the Related Art

In a conventional rotary machine including a stator armature (hereinafter referred to as "armature") structured such that a plurality of ring-shaped yoke pieces, which are made of a soft magnetic plate, such as a silicon steel plate, and which each have a plurality of pole tooth portions protruding radially, are stacked in the axial direction, since each of the ring-shaped yoke pieces is punched out integrally with the plurality of pole tooth portions as a single piece (the armature composed of the ring-shaped yoke pieces thus structured is hereinafter referred to as "integral armature" as appropriate), pole teeth each composed of a stack number of pole tooth portions are not partitioned structurally and therefore a resultant armature will have superior magnetic efficiency (low reluctance). However, in a small rotary machine, since a wire is usually wound directly on each of the pole teeth, the integral armature makes the winding operation troublesome, and makes it extremely troublesome when the rotary machine is of inner rotor type. As a result, the winding operation takes a long time, and the winding incurs unsatisfactory space factor as well. And, due to the flyer-winding involved in this case, the wire is subject to torsional stress during the winding operation, thereby failing to ensure reliability of the winding area.

Under the circumstances above described, a rare earth magnet having high energy product has been developed recently, and the structure of a rotary machine can be reviewed by means of magnetic circuit analysis using a computer. This works to enable a rotary machine with an armature of discrete salient pole structure (this armature is hereinafter referred to as "discrete armature" as appropriate) to obtain requisite motor characteristics. The rotary machine with the discrete armature may give some undesired increase in reluctance but offers great advantages of easier winding operation and increased space factor of winding, which outweigh the disadvantageous increase in reluctance. From this, it is now realized that the rotary machine with the discrete armature produces higher performance and is manufactured less expensively on the whole, and there is a growing demand for the discrete armature.

One example of the discrete armature is manufactured such that pole tooth portions are dismembered off its main body portion of an integral armature, a wire is wound on each of the dismembered pole tooth portions thereby constituting each salient pole portion, and such that the pole tooth portions each with a wire wound thereon (namely, the salient pole portions) are rejoined to the main body portion by laser-welding, or the like.

The armature thus structured and manufactured, however, has a disadvantage that the integral armature has to be first sectioned into the main body portion and the pole tooth portions and later the sectioned portions have to be put back together, thereby requiring an additional time. Also, when the pole tooth portions each with a winding (salient poles) are rejoined to the main body portion, the stack layers of the both portions have to be matched with each other, and therefore it is required that respective portions be held together by a well-maintained tool and surely welded plate by plate for ensuring precision, which results in decreased workability. And, joints (welded portions) deteriorate significantly in mechanical strength and magnetic characteristics.

To overcome the above described problems, the present inventors disclosed in Japanese Patent Application Laid-open No. 2001-238377 a radial gap type rotary machine, in which an armature comprises: a plurality of discrete salient poles; a cylindrical pole tooth ring for positioning and magnetically and mechanically connecting the salient poles to one another; and a cylindrical stator ring adapted to house the salient poles and to decrease leakage flux resulting from magnetic discontinuity.

In the above described rotary machine, the salient poles must be accurately arranged as determined and securely fixed to achieve the performance required. If the salient poles are not accurately arranged as determined, the rotary machine suffers an increase in torque ripple and cogging torque, resulting in deteriorated performance. To solve this problem, in the conventional rotary machine, the salient poles are each provided with a bobbin, and are put together such that their respective bobbin flanges are firmly pressed side to side against one another or are configured so as to engage with one another, and then that a molding resin is injected to fill the space between the salient poles for further secure fixation.

The above mentioned solution, however, raises the following problem. When the molding resin injected is cured, pole teeth of the salient poles are moved slightly due to the stress resulting from the contraction of the resin, which generates variance in contact condition between respective pole teeth and the stator ring thereby increasing torque ripple and cogging torque. Also, the movement of the pole teeth may cause the stator and the rotor to fail to stay concentric with each other, thereby giving a similar problem. Especially, a larger-size rotary machine is larger in the amount of the resin injected, rendering the problem more noticeable.

SUMMARY OF THE INVEVTION

The present invention has been made in view of the above problem, and it is an object of the invention to provide a rotary machine, in which a stator is assembled such that discrete salient poles are disposed inside a stator ring and a molding resin is injected inside the stator ring to fix the salient poles, and in which pole teeth of the salient poles are prevented from moving due to a stress induced when the resin is injected or cured.

In order to achieve the object, according to a first aspect of the present invention, a rotary machine includes a stator comprising: a stator ring; a plurality of discrete salient poles each comprising a bobbin and a pole tooth, disposed inside the stator ring, and fixed by a molding resin injected inside the stator; and a positioning ring disposed to be surrounded by the salient poles and adapted to engage therewith.

According to a second aspect of the present invention, in the rotary machine of the first aspect, the positioning ring includes on its outer circumference a plurality of protrusions identical in number with and corresponding in position to the discrete salient poles, the bobbin has a pair of guide grooves formed on its inward-positioned flange, extending circumferentially, and disposed in line with each other, the pole tooth has a groove having a depth larger than that of the guide grooves of the bobbin, and the protrusions of the positioning ring each engage with the groove of the pole tooth.

According to a third aspect of the present invention, in the rotary machine of the second aspect, the groove is located at the center of the pole tooth with regard to the axial direction of the rotary machine.

According to a fourth aspect of the present invention, in the rotary machine of any one of the first to third aspects, the positioning ring is made of a magnetically insulating material.

In the rotary machine according to the present invention, the positioning ring prevents the pole teeth of the salient poles from moving both radially and circumferentially due to the stress generated when the molding resin injected is cured, which maintains the accuracy of the inner diameter of the stator thereby keeping the stator and the rotor concentric with each other. The salient poles can be assembled with accuracy such that the protrusions of the positioning ring are simply fitted into the grooves formed on the pole teeth of the salient poles, thereby making the assembly operation easier. Further, the protrusions of the positioning ring, the groove of the pole tooth and the guide grooves of the bobbin are dimensioned so that the pole tooth and the positioning ring are securely fitted into the bobbin due to the elasticity of the bobbin, and consequently the pole tooth is securely fixed to the positioning ring. And, when the positioning ring is made of a ferromagnetic material, the effective flux waveform in air gap is modulated, thereby reducing torque ripple.

BRIEF DESCRIPTION OF THE DRAWINGS

The present invention is explained with reference to the drawings, which are presented for the purpose of illustration only and in no way limit the invention, and in which:

FIGS. 3A and 3B in combination constitute an exploded perspective view of a salient pole (omitting a coil) shown in FIGS. 1 and 2, respectively showing a bobbin and a pole tooth;

FIG. 4 is a perspective view of the salient pole (including the coil) shown in FIGS. 1 and 2;

FIGS. 5A and 5B in combination constitute an exploded perspective view of an armature assembly shown in FIG. 1, wherein FIG. 5A shows six salient poles extending radially and arrayed circumferentially at a regular angular interval of 60 degrees with respective bobbin inward flanges in contact with one another, and FIG. 5B shows a stator ring;

DETAILED DESCRIPTION OF THE PREFERRED EMBODIMENTS

A preferred embodiment of the present invention will be described with reference to the drawings.

Figure 1:
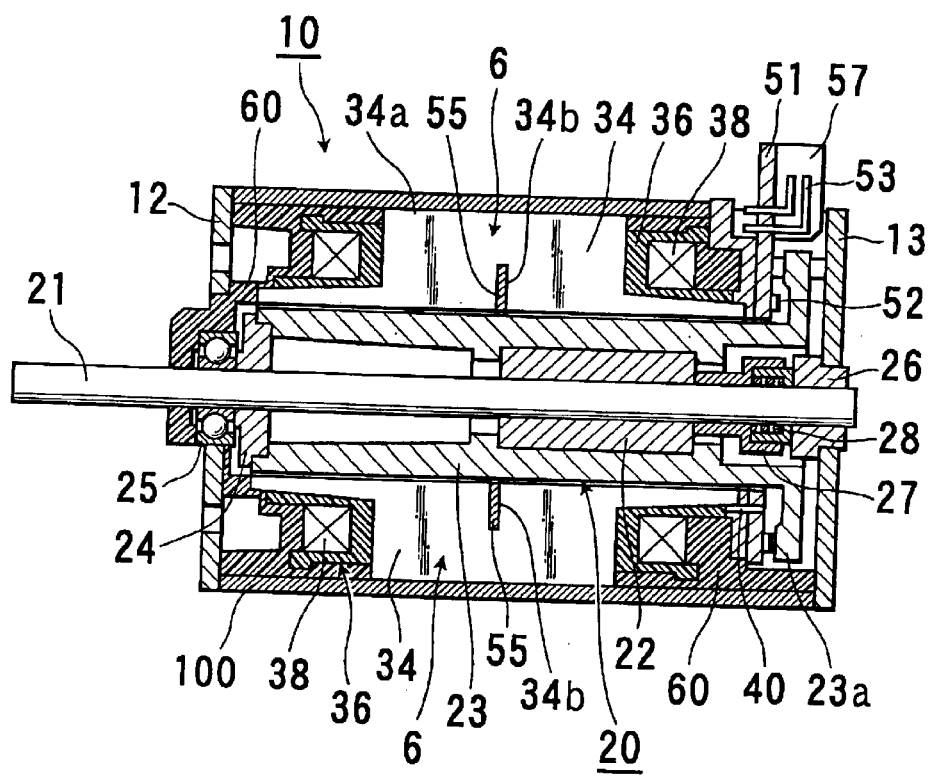
FIG. 1 is an axial section view of a first embodiment of the present invention.
Figure 2:
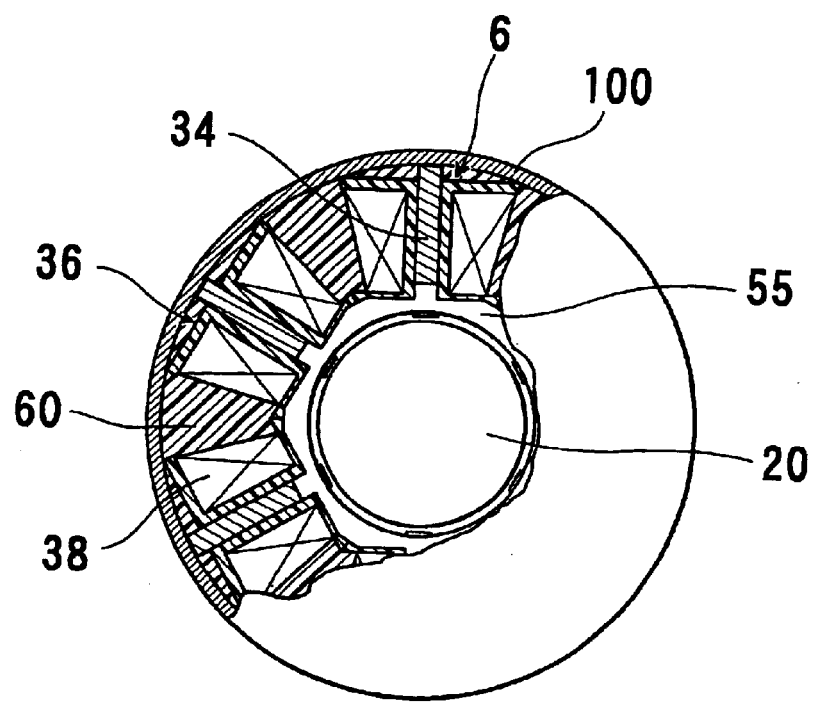
FIG. 2 is a partial radial section view of FIG. 1.

Referring to FIGS. 1 and 2, illustrated are: salient poles 6, an armature assembly 10, flanges 12 and 13, a rotor assembly 20, a shaft 21, a sleeve 22, a rotor field magnet 23, a rotor position detecting magnet 23a, a spacer 24, a ball bearing 25, a sleeve bearing 26, a preload spring holder 27, a preload spring 28, pole teeth 34, pole tooth end portions 34a, grooves 34b, bobbins 36, magnet wires 38, a printed circuit board 51, a Hall sensor 52, connector terminals 53, a positioning ring 55, a connector 57, a molding resin 60, and a stator ring 100.

The rotary machine disclosed in the aforementioned Japanese Patent Application Laid-open No. 2001-238377 has a pole tooth ring for connecting the salient poles to one another magnetically and mechanically, but the pole tooth ring is not essential for the prevent invention and is omitted in the description of the embodiment. It is however noted that the present invention can be applied to a rotary machine having the pole tooth ring.

The embodiment here refers to a three-phase inner rotor type brushless DC motor with six salient poles and eight magnetic poles on the rotor, and FIGS. 1 and 2 show a so-called integrally resin-molded armature assembly structured such that a resin is filled inside an armature assembly except a portion where a rotor field magnet is received.

The brushless DC motor generally comprises: the armature assembly 10; the two flanges 12 and 13 arranged respectively at both axial ends of the armature assembly 10; and the rotor assembly 20 rotatably disposed inside the armature assembly 10.

The armature assembly 10 includes: the stator ring 100 as its outer circumference; and six of the salient poles 6 each extending radially, and arrayed circumferentially at an even angular interval of 60 degrees.

The salient poles 6 will be described below with reference to FIGS. 3A, 3B and 4. In FIGS. 3A, 3B and 4, the constituting parts same as or corresponding to those shown in FIGS. 1 and 2 have the same reference numbers.

The salient poles 6 are each structured such that the pole tooth 34 (FIG. 3B) composed of seven surface-insulated magnetic steel plates stacked on one another, each plate having a thickness of 0.5 mm, and punched out to be substantially T-shaped, has its T-letter's vertical (oriented horizontal in the figure) bar portion inserted into a rectangular hole 36a of the resin bobbin 36 (FIG. 3A), and such that the magnet wire 38 is wound on the bobbin 36 between the bobbin flanges 36b and 36c as shown in FIG. 4. The substantially T-shaped pole tooth 34 has a thickness T1, and the vertical bar portion thereof has a width T2 and has a length so as to protrude by a dimension T3 overall from the surface of the bobbin flange 36b when fitted into the hole 36a of the bobbin 36.

The pole tooth 34 may alternatively be made of a soft magnetic material such as a ceramic molding formed by sintering a soft magnetic powder, and a metallurgic molding formed by sintering a soft magnetic material composed of micro-powder of surface-insulated pure iron. The pole tooth 34 made of a different soft magnetic steel material containing Fe—Ni—Cr series steel not only keeps a high permeability but also has a relatively high electrical resistance thereby reducing its eddy current loss, and at the same time is free from corrosion without rustproof treatment, thus being rendered suitable for use in extreme environments such as automotive application.

The pole tooth 34 has a groove 34b, as shown in FIG. 3B, which is adapted to engage with the positioning ring 55. The groove 34b is preferably provided at the center of the pole tooth 34 with regard to the axial direction of the rotary machine, where magnetic influence is small. And the bobbin 36 has guide grooves 36e for receiving the positioning ring 55.

The bobbin flange 36c has, on each of its both sides, two notches 36d, 36d forming resin injection holes 37 (to be described later: see upcoming FIG. 5A) for injecting the molding resin 60 through.

The magnet wire 38 has its both terminations bound around respective terminal pins 40 attached to the lower end of the bobbin flange 36c.

Figure 5A:
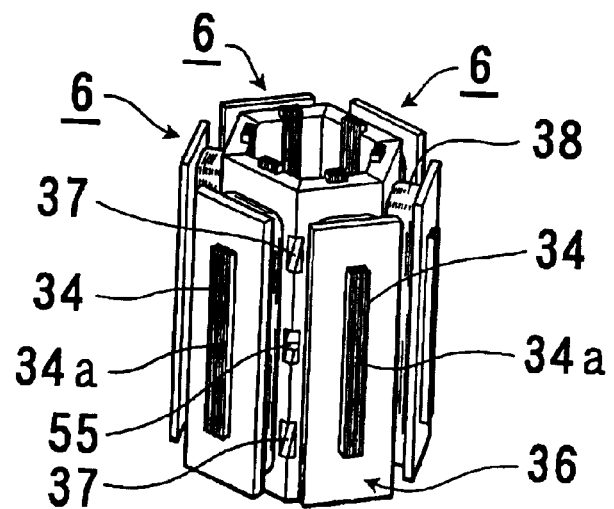
Figure 5B:
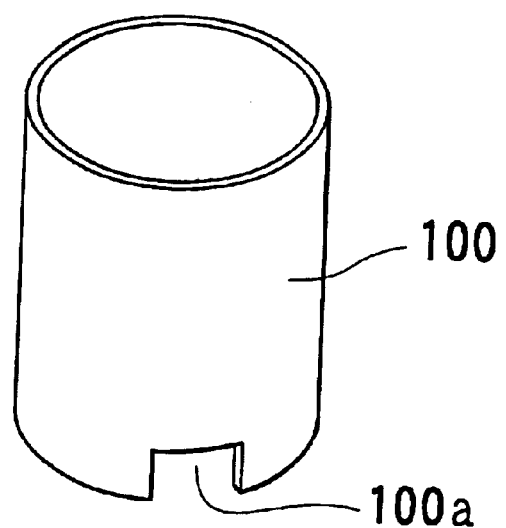

The structure of the armature assembly 10 will be described below with reference to FIGS. 5A and 5B. In FIGS. 5A and 5B, the constituting parts same as or corresponding to those shown in FIGS. 1 to 4 have the same reference numbers.

Referring to FIG. 5A showing a salient pole assembly, two of the aforementioned resin injection holes 37 are each formed at every interface between two adjacent bobbin flanges 36c, 36c (see FIGS. 3 and 4) laterally butting each other, such that two notches 36d, 36d (see FIGS. 3 and 4) formed on the butting surface of one bobbin flange 36c of the two oppose respectively two notches 36d, 36d formed on the butting surface of the other bobbin flange 36c of the two.

FIG. 5B shows the aforementioned stator ring 100 for housing the salient pole assembly shown in FIG. 5A. The stator ring 100 is a hollow cylinder of a soft magnetic steel plate, and is provided with a cutaway 100a for accommodating the connector 57 (see FIG. 1).

Figure 7:
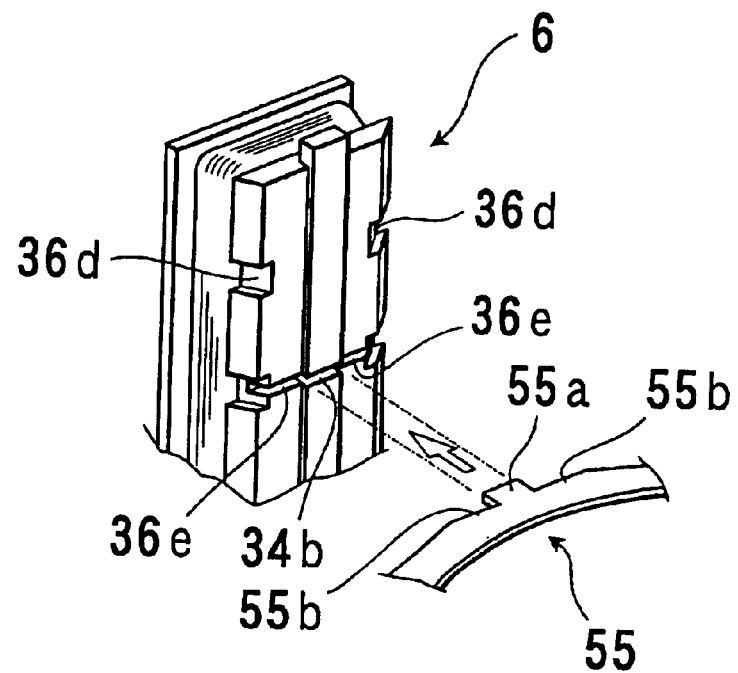
FIG. 7 is a perspective view of explaining how the positioning ring of FIG. 6 engages with each of the salient poles.

At the inner side of each of the salient poles 6, the positioning ring 55 is fitted into the groove 34b of the pole tooth 34 and the guide grooves 36e of the bobbin 36 as will be shown in upcoming FIG. 7, thereby preventing the salient poles 6 from moving out of place during assembly process.

Figure 6:
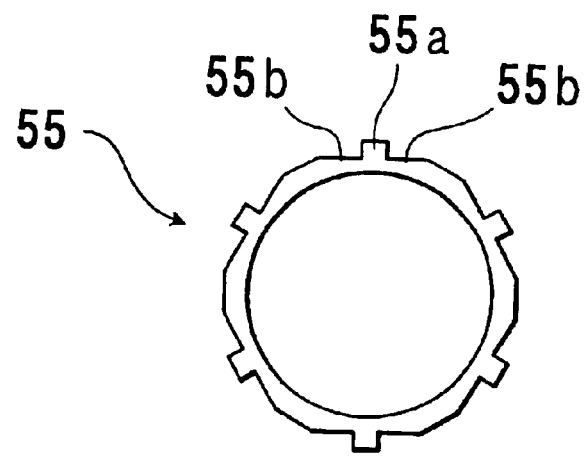
FIG. 6 is a plan view of a positioning ring shown in FIGS. 1 and 2.

The positioning ring 55 will be described in detail with reference to FIG. 6. In FIG. 6, the constituting parts same as or corresponding to those shown in FIGS. 1 to 5B have the same reference numbers.

The positioning of ring 55 is made of a thin plate configured as shown in the figure and having a thickness appropriate to fit into the groove 34b of the pole tooth 34 and the guide grooves 36e of the bobbin 36. The positioning ring 55 is of a rigid and non-magnetic insulator and preferably aluminum. This prevents an increase in no-load current due to leakage flux in the positioning ring 55, thereby decreasing factors lowering efficiency of a rotary machine. When a high performance is not required of the rotary machine, the positioning ring 55 may be formed of a ferromagnetic material. In this case, the flux of the rotor field magnet is partly bypassed through the positioning ring 55, whereby the effective flux waveform in air gap is modulated (the gradient of flux variation is reduced), which can reduce torque ripple.

The positioning ring 55 comprises six protrusions 55a respectively corresponding to six of the salient poles 6, each of the protrusions 55a being sandwiched between two flat shoulders 55b arranged in line with each other.

The positioning ring 55 will be further described with reference to FIGS. 7 to 9, in which the constituting parts same as or corresponding to those shown in FIGS. 1 to 6 have the same reference numbers.

Figure 8:
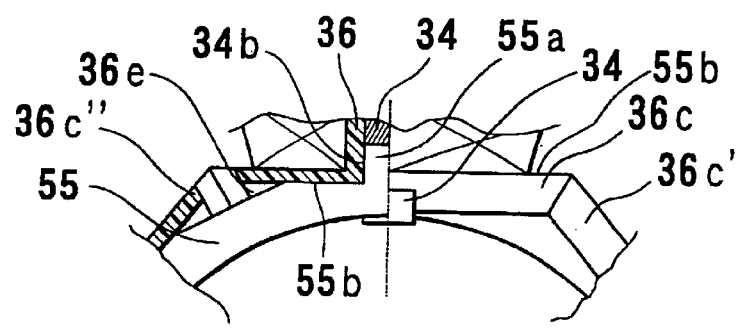
FIG. 8 is a view of the armature assembly shown in FIG. 1, showing the bobbin inward flanges and the positioning ring, wherein the left half shows a radial section along the positioning ring and the right half shows a plan view.

The guide grooves 36e and the groove 34b are positioned to align with each other when the pole tooth 34 is fitted into the hole 36a of the bobbin 36 as shown in FIG. 7, and the positioning ring 55 is fitted into the guide grooves 36e and the groove 34b such that the protrusion 55a engages with the groove 34b and the flat shoulders 55b engage with respective guide grooves 36e as shown in FIG. 8.

Figure 9:
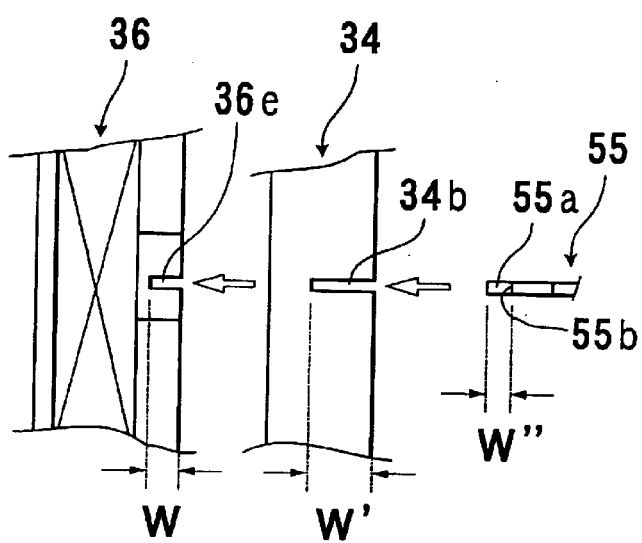
FIG. 9 is a partial side view of the salient pole of FIGS. 1 and 2, showing a dimensional relation between the depth of guide grooves of the bobbin, the depth of a groove of the pole tooth, and the height of protrusions of the positioning ring.

Referring to FIG. 9, a formula: $W<W'$ is desired, and at the same time a formula: $(W'-W) \geq W''$ is desired for a stable engagement, where W is the depth of the guide grooves 36e, W' is the depth of the groove 34b, and W'' is the height of the protrusion 55a.

What is claimed is:

1. An electric rotary machine, including a stator comprising:
   a stator ring;
   a plurality of discrete salient poles each comprising a bobbin and a pole tooth, disposed inside the stator ring, and fixed by a molding resin injected inside the stator; and
   a positioning ring, the positioning ring being disposed inside the salient poles and engaged therewith, wherein the positioning ring has on an outer circumference a plurality of protrusions identical in number with and corresponding in position to the discrete salient poles, the bobbin has a pair of guide grooves formed on an inward-positioned flange, extending circumferentially, and disposed in line with each other, and the pole tooth has a groove disposed in line with the guide grooves and having a depth larger than that of the guide grooves of the bobbin, and wherein the protrusions of the positioning ring each engage with the groove of the pole tooth.

2. An electric rotary machine according to claim 1, wherein the groove is located at a center of the pole tooth with regard to an axial direction of the electric rotary machine.

3. An electric rotary machine according to claim 1 wherein the positioning ring is made of a magnetically insulating material.

4. An electric rotary machine according to claim 2 wherein the positioning ring is made of a magnetically insulating material.

* * * * *